US009779470B2

(12) United States Patent
Bishop et al.

(10) Patent No.: US 9,779,470 B2
(45) Date of Patent: *Oct. 3, 2017

(54) MULTI-LINE IMAGE PROCESSING WITH PARALLEL PROCESSING UNITS

(71) Applicant: Imagination Technologies Limited, Kings Langley (GB)

(72) Inventors: Michael Bishop, Kings Langley (GB); Morgyn Taylor, Santa Clara, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,848

(22) Filed: Jan. 19, 2017

(65) Prior Publication Data

US 2017/0132750 A1  May 11, 2017

Related U.S. Application Data

(63) Continuation of application No. 14/332,299, filed on Jul. 15, 2014, now Pat. No. 9,584,719.

(30) Foreign Application Priority Data

Jul. 18, 2013 (GB) .................. 1312852.5

(51) Int. Cl.
*G06T 1/20* (2006.01)
*H04N 5/232* (2006.01)

(52) U.S. Cl.
CPC ........... *G06T 1/20* (2013.01); *H04N 5/23229* (2013.01); *G06T 2207/20021* (2013.01); *G06T 2207/20028* (2013.01); *G06T 2210/52* (2013.01)

(58) Field of Classification Search
CPC .......... G05B 2219/33081; G05B 2219/15131; G05B 2219/23217; G05B 2219/34437; G05B 2219/25019; H04N 19/439; H04N 5/772; H04N 5/23229; H04N 19/59; H04N 7/0135; G06T 2210/52; G06T 1/20; G06F 15/8015
USPC ..... 382/302–307; 700/2, 4–5; 345/501, 502, 345/505, 506
See application file for complete search history.

(56) References Cited

U.S. PATENT DOCUMENTS 4,816,993 A * 3/1989 Takahashi ........... G06F 15/8015
712/28
5,642,444 A    6/1997 Mostafavi
5,666,169 A    9/1997 Ohki
(Continued)

FOREIGN PATENT DOCUMENTS

CN    103019656 A    4/2013
EP    0495537 A2    7/1992
(Continued)

*Primary Examiner* — Michael Osinski
(74) *Attorney, Agent, or Firm* — Vorys, Sater, Seymour and Pease, LLP; Vincent M DeLuca

(57) ABSTRACT

An image processing system is described herein in which a multi-line processing block has multiple inputs and multiple outputs. In order to provide the multiple outputs the multi-line processing block has multiple processing units operating in parallel on the multiple inputs. The multiple outputs of the multi-line processing block are coupled to corresponding multiple inputs of a subsequent multi-line processing block in the image processing system.

20 Claims, 7 Drawing Sheets

(56) References Cited

U.S. PATENT DOCUMENTS

| | | |
|---|---|---|
| 5,724,602 A | 3/1998 | Tanaka |
| 6,115,134 A * | 9/2000 | Creel .................... G06K 15/02 |
| | | 358/1.16 |
| 6,308,251 B1 | 10/2001 | Hashiguchi |
| 6,317,159 B1 | 11/2001 | Aoyama |
| 6,452,149 B1 | 9/2002 | Yamashita |
| 6,803,951 B1 | 10/2004 | Matsukawa |
| 7,176,966 B2 | 2/2007 | Inoue |
| 7,193,657 B2 | 3/2007 | Chida |
| 7,636,498 B2 | 12/2009 | Furukawa |
| 8,031,245 B2 | 10/2011 | Taoka |
| 8,149,469 B2 | 4/2012 | Tada |
| 8,482,570 B2 | 7/2013 | Fukuchi |
| 8,532,370 B2 * | 9/2013 | Sasaki .................... H04N 9/045 |
| | | 382/162 |
| 8,610,793 B2 * | 12/2013 | Kuroiwa .................... G06T 1/20 |
| | | 348/222.1 |
| 8,644,643 B2 | 2/2014 | Jiao |
| 8,869,147 B2 | 10/2014 | Du |
| 8,995,794 B2 | 3/2015 | McLean |
| 2003/0123741 A1 | 7/2003 | Ueno |
| 2004/0046880 A1 | 3/2004 | Kawakubo |
| 2004/0095508 A1 | 5/2004 | Chida |
| 2005/0018929 A1 | 1/2005 | Lippincott |
| 2005/0219422 A1 | 10/2005 | Dorojevets |
| 2005/0226337 A1 | 10/2005 | Dorojevets |
| 2006/0114330 A1 * | 6/2006 | Kuroiwa .................... G06T 1/20 |
| | | 348/207.99 |
| 2006/0232692 A1 | 10/2006 | Takane |
| 2007/0053664 A1 * | 3/2007 | Sugeno .................... H04N 5/232 |
| | | 386/224 |
| 2007/0097239 A1 * | 5/2007 | Kaplinsky .................... G06T 1/20 |
| | | 348/282 |
| 2008/0013862 A1 | 1/2008 | Isaka |
| 2008/0101727 A1 | 5/2008 | Talla |
| 2008/0320276 A1 | 12/2008 | Krottendorfer |
| 2009/0167916 A1 | 7/2009 | Taoka |
| 2009/0213265 A1 | 8/2009 | Yamashita |
| 2010/0177108 A1 | 7/2010 | Fukuchi |
| 2010/0245627 A1 * | 9/2010 | Mellot .................... G06T 1/20 |
| | | 348/231.99 |
| 2011/0193988 A1 | 8/2011 | Hatano |
| 2012/0127344 A1 | 5/2012 | Yanada |
| 2012/0200748 A1 * | 8/2012 | Utsugi .................... G06T 5/002 |
| | | 348/241 |
| 2013/0063630 A1 | 3/2013 | Yanada |
| 2014/0232914 A1 | 8/2014 | Awatani |

FOREIGN PATENT DOCUMENTS

| | | |
|---|---|---|
| JP | 63-67686 A | 3/1988 |
| JP | 8-329229 A | 12/1996 |
| WO | 2008/027573 A2 | 3/2008 |

\* cited by examiner

MULTI-LINE IMAGE PROCESSING WITH PARALLEL PROCESSING UNITS

BACKGROUND

An image may be represented by a two-dimensional (2D) array of pixels. For example, digital cameras include an array of image sensors (e.g. charged coupled devices (CCDs) or complementary metal-oxide-semiconductor (CMOS) sensors) for capturing pixel values representing an image. Image processing systems are available which process the pixel values representing an image. Image processing performed on pixel values of an image may include many different functions. For example, the pixel values may be modified (e.g. to improve the perceptual quality of the image), by functions such as filtering and sharpening. Other functions of image processing may be to compress or encode image data into particular formats, such as the Joint Photographic Experts Group (JPEG) format or the Moving Picture Experts Group (MPEG) format.

An image processing system may be implemented in a pipeline arrangement, whereby multiple processing blocks of the image processing system perform respective functions on pixels values representing an image. An image processing system will often include both single-line processing blocks and multi-line processing blocks. Single-line processing blocks act upon pixel values from a single line (e.g. a row) of pixels of the image without requiring access to pixel values from other pixel lines (e.g. rows) of the image. Examples of single-line processing blocks include a block to adjust the gains of the pixel values, a block to adjust the white balance of the pixel values and a one-dimensional (1D) filtering block which performs filtering along one of the lines (e.g. a row) of pixels.

In contrast, when a multi-line processing block acts upon pixel values from a line (e.g. a row) of pixels of the image it requires access to pixel values from multiple pixel lines (e.g. multiple rows) of the image. For example, a multi-line processing block may require access to pixel values from rows above the current pixel in a raster scan. Examples of multi-line processing blocks include a 2D filtering block and a 1D filtering block which performs filtering in a direction that is not parallel to the lines (e.g. rows) of pixels in the image. In order to allow a multi-line processing block to access pixel values from multiple lines (e.g. rows) of the image, the image processing system comprises a line store module which stores lines (e.g. rows) of pixel values of the image. Implementing a line store module uses power and silicon area in order to store the lines of pixel values.

Image processing systems often include more than one multi-line processing block. In this case, a line store module (which may also be referred to herein as a "line store bank") is implemented before each multi-line processing block in the image processing system. This is shown in FIG. 1 which illustrates a simplified schematic diagram of part of an image processing system comprising two multi-line processing blocks $102_1$ and $102_2$ (e.g. which may be 2D processing blocks). The image processing system also comprises two line store modules $104_1$ and $104_2$. Multiple outputs of the line store module $104_1$ are coupled to respective multiple inputs of the processing block $102_1$. An output of the processing block $102_1$ is coupled to an input of the line store module $104_2$. This connection is shown by a dashed line in FIG. 1 because there may or may not be other functional blocks (not shown in FIG. 1) which act on the image data between the output from the processing block $102_1$ and the input to the line store module $104_2$. Multiple outputs of the line store module $104_2$ are coupled to respective multiple inputs of the processing block $102_2$.

As illustrated in FIG. 1, in operation, the line store module $104_1$ is arranged to receive an input data stream. The input data stream may provide the pixel values relating to the rows of the image in a serial manner (according to the raster scan) to the line store module $104_1$. The line store module $104_1$ stores the pixel values for a plurality of rows of the image. In one example, on each of a plurality of consecutive clock cycles the line store module $104_1$ may provide multiple pixel values, from respective multiple rows of the image to the multi-line processing block $102_1$. The multi-line processing block $102_1$ processes the inputs (e.g. by performing 2D filtering to thereby filter the pixel values for a central row based on the surrounding pixel values) and provides a single output pixel value (e.g. a filtered pixel value of the central row) per clock cycle. The single row output stream may pass from the multi-line processing block $102_1$ to the line store module $104_2$. As described above, there may, or may not, be other functional blocks in the image processing system implemented between the processing block $102_1$ and the line store module $104_2$.

The line store module $104_2$ and multi-line processing block $102_2$ correspond to the line store module $104_1$ and multi-line processing block $102_1$, and function in a corresponding manner. In this way, multiple outputs are provided from the line store module $104_2$ to multiple inputs of the processing block $102_2$ which are then processed (e.g. filtered) by the multi-line processing module $102_2$ to provide a single output stream of pixel values.

A line store module 104 is implemented before each multi-line processing block 102 in the image processing system to provide the multiple row inputs required by the respective multi-line processing block 102.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An image processing system is described herein in which a multi-line processing block has multiple inputs and multiple outputs. In order to provide the multiple outputs the multi-line processing block has multiple processing units operating in parallel on the multiple inputs. The multiple outputs of the multi-line processing block are coupled to corresponding multiple inputs of a subsequent multi-line processing block in the image processing system.

In particular, there is provided an image processing system comprising a first multi-line processing block comprising a plurality of inputs configured to receive, in parallel, pixel values relating to a respective plurality of pixel lines of an image. The first processing block comprises a plurality of processing units configured to operate in parallel with each other. Each of the processing units is configured to provide processed pixel values relating to a respective one of said pixel lines of the image by applying multi-line processing to the pixel values received at at least some of said inputs of the first processing block. The image processing system further comprises a second multi-line processing block comprising a plurality of inputs configured to receive from the first processing block, in parallel, the processed pixel values provided by the processing units of the first processing block. The second processing block is configured to apply multi-line processing to the processed pixel values received from the first processing block.

The image processing system may have fewer line store modules than multi-line processing blocks. For example, one line store module may be included in the image processing system to provide the multiple inputs to the first multi-line processing block, but the outputs of the first multi-line processing block may be provided directly to the inputs of the second multi-line processing block. In this way, another line store module does not need to be included in the image processing system to provide the inputs to the second multi-line processing block.

The same principles may be applied for a sequence of more than two multi-line processing blocks in the image processing system. In this way, the second multi-line processing block may provide multiple outputs to the inputs of a third multi-line processing block.

There is also provided a method of processing an image, in which the method comprises: receiving, in parallel, at a plurality of inputs of a first multi-line processing block, pixel values relating to a respective plurality of pixel lines of an image; operating a plurality of processing units of the first processing block in parallel with each other, wherein the operation of each of the processing units provides processed pixel values relating to a respective one of said pixel lines of the image by applying multi-line processing to the pixel values received at at least some of said inputs of the first processing block; and receiving from the first processing block, in parallel, at a plurality of inputs of a second multi-line processing block, the processed pixel values provided by the operation of the processing units of the first processing block, wherein the second processing block is configured to apply multi-line processing to the processed pixel values received from the first processing block.

There is also provided an image processing system comprising a line store module and a set of one or more multi-line processing blocks. The line store module is configured to: receive pixel values relating to N pixel lines of an image in each of a plurality of processing cycles, where N>1; and output, in parallel, pixel values relating to M pixel lines of the image in each of the processing cycles, where M>N. Each of the multi-line processing blocks comprises: a plurality of inputs configured to receive, in parallel, pixel values relating to a respective plurality of the pixel lines of the image; and a plurality of processing units configured to operate in parallel with each other, each of the processing units being configured to provide processed pixel values relating to a respective one of the pixel lines of the image by applying multi-line processing to the pixel values received at at least some of the inputs of the multi-line processing block, wherein a first of the multi-line processing blocks in the set is arranged to receive, in parallel, the pixels values relating to the M pixel lines output from the line store module, and wherein a last of the multi-line processing blocks in the set is arranged to provide, in each of the processing cycles, processed pixel values relating to N of the pixel lines of the image for further processing in the image processing system.

There is also provided a method of processing an image using a set of one or more multi-line processing blocks, the method comprising: receiving pixel values relating to N pixel lines of an image at a line store module in each of a plurality of processing cycles, where N>1; outputting from the line store module, in parallel, pixel values relating to M pixel lines of the image in each of the processing cycles, where M>N; receiving, in parallel, at a plurality of inputs of a first of the multi-line processing blocks in the set, pixel values relating to the M pixel lines of the image output from the line store module; operating a plurality of processing units of the first of the multi-line processing blocks in parallel with each other, wherein the operation of each of the processing units provides processed pixel values relating to a respective one of the pixel lines of the image by applying multi-line processing to the pixel values received at at least some of the inputs of the first of the multi-line processing blocks of the set; and providing, from a last of the multi-line processing blocks in the set, in each of the processing cycles, processed pixel values relating to N of the pixel lines of the image for further processing in the image processing system.

The above features may be combined as appropriate, as would be apparent to a skilled person, and may be combined with any of the aspects of the examples.

BRIEF DESCRIPTION OF THE DRAWINGS

Examples will now be described in detail by way of reference to the accompanying drawings in which.

Figure 1:
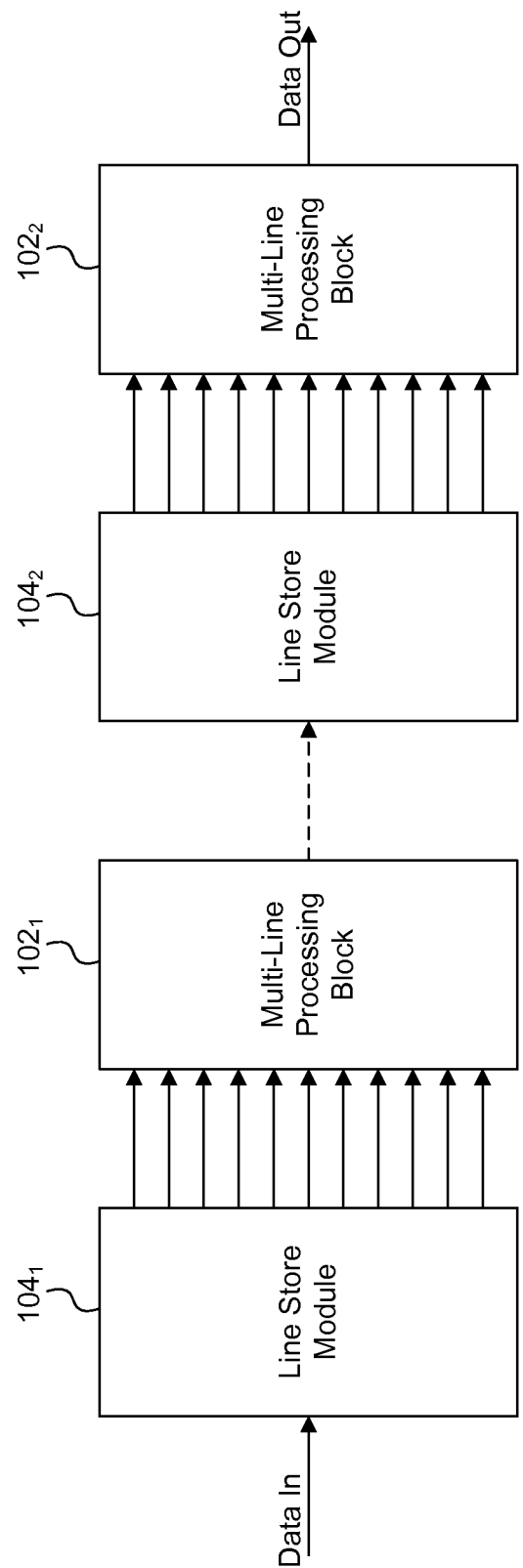
FIG. 1 is a simplified schematic diagram of part of an image processing system of the prior art.

Common reference numerals are used throughout the figures to indicate similar features.

DETAILED DESCRIPTION

Embodiments will now be described by way of example only.

Figure 2:
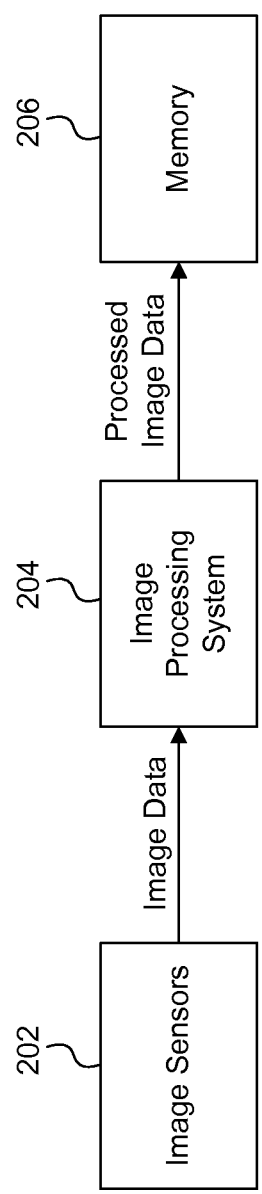
FIG. 2 shows a simplified block diagram of functional blocks of an image processing device.

FIG. 2 shows a simplified block diagram of functional blocks of an image processing device. The image processing device comprises image sensors 202, an image processing system 204 and a memory 206. As shown in FIG. 2, the image sensors are arranged to provide image data to the image processing system 204. The image processing system 204 is arranged to process the image data as described in more detail below and to provide processed image data for storage in the memory 206. The image sensors 202 (e.g. charged coupled devices (CCDs) or complementary metal-oxide-semiconductor (CMOS) sensors) are arranged in an array and are configured to capture pixel values representing an image, which are then provided as image data to the image processing system 204 (which may be referred to herein as an "image processing pipeline"). The processed image data comprises a plurality of processed pixel values representing the image. The image processing performed on pixel values of an image may include many different functions. For example, the pixel values may be modified (e.g. to improve the perceptual quality of the image), by functions such as filtering and sharpening. Other functions of image processing may be to compress or encode image data into particular formats, such as the Joint Photographic Experts Group (JPEG) format or the Moving Picture Experts Group (MPEG) format. The image data may relate to a single image (e.g. a photograph) or to frames of a video stream. The processed image data output from the image processing system 204 may be used in one or more ways as would be apparent to a person skilled in the art. For example the processed image data may be stored in the memory 206. Alternatively, or additionally, the processed image data may be provided to a display for output therefrom. Alternatively, or additionally, the processed image data may be transmitted to another device, e.g. over the Internet or a cellular communications network.

It is described above that the image sensors 202, image processing system 204 and memory 206 reside on the same device. However, in other examples, the image sensors 202, image processing system 204 and/or memory 206 do not reside on the same device. For example, the image sensors 202 may be implemented in a camera which is a different device to that at which the image processing system 204 is implemented. Furthermore, in other examples, the image processing system 204 may receive the image data from a source other than the image sensors 202. For example, the image data may be stored in the memory 206 and may be provided from the memory 206 to the image processing system 204.

Figure 3:
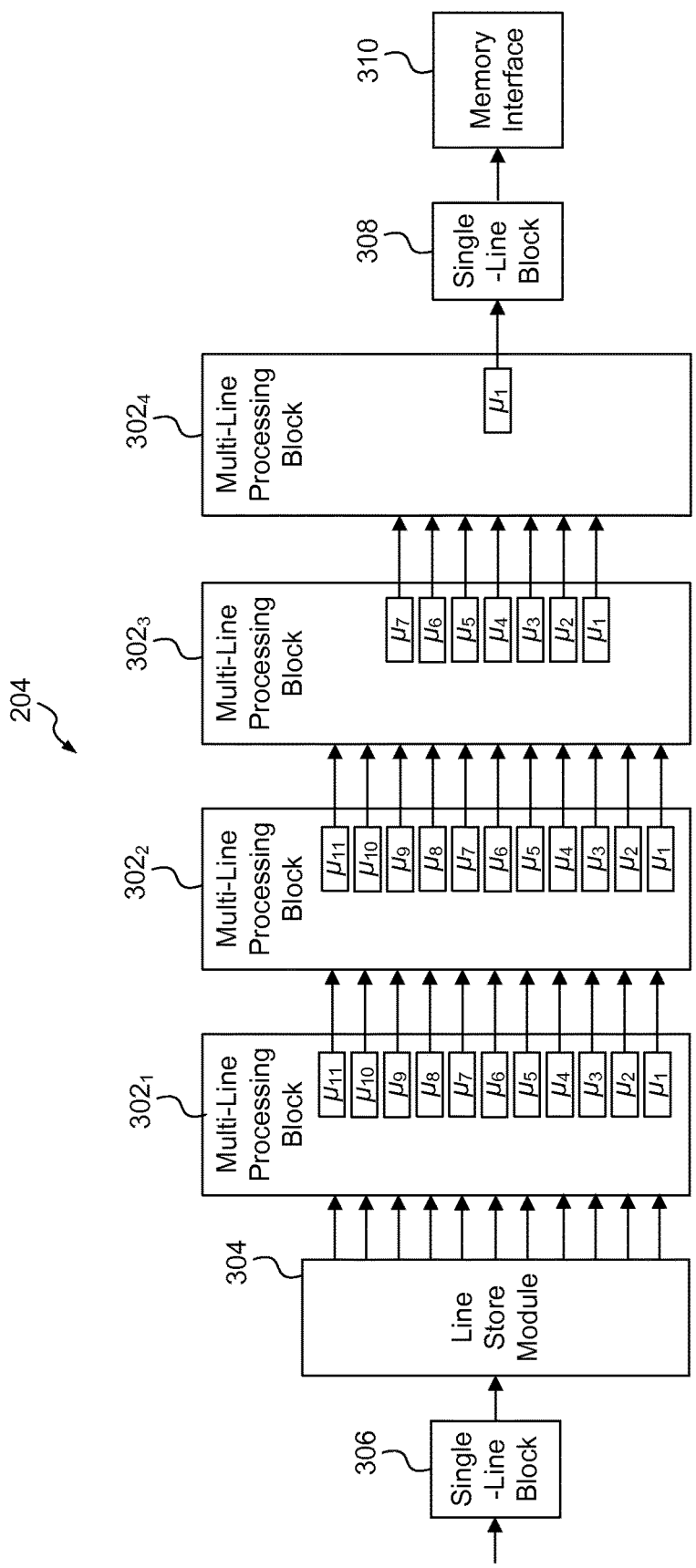
FIG. 3 is a simplified schematic diagram of part of an image processing system.

The image processing system 204 includes both single-line and multi-line processing blocks. FIG. 3 is a simplified schematic diagram of part of the image processing system 204. FIG. 3 shows the image processing system 204 comprising four multi-line processing blocks labelled $302_1$, $302_2$, $302_3$ and $302_4$, a line store module 304, two single-line processing blocks 306 and 308 and a memory interface 310. The first multi-line processing block $302_1$ comprises a plurality (e.g. eleven) processing units (which may also be referred to herein as "kernels") labelled "μ" in FIG. 3. Similarly, the second multi-line processing block $302_2$ comprises a plurality (e.g. eleven) processing units, the third multi-line processing block $302_3$ comprises a plurality (e.g. seven) processing units and the fourth multi-line processing block $302_4$ comprises a processing unit. The image processing system 204 may further comprise processing blocks which are not shown in FIG. 3 for clarity. The single-line processing block 306 is arranged to receive pixel values of an image from preceding blocks of the image processing system 204. An output of the single-line processing block 306 is coupled to an input of the line store module 304. Multiple outputs of the line store module 304 are coupled to respective multiple inputs of the multi-line processing block $302_1$. Multiple outputs of the multi-line processing block $302_1$ (from the respective processing units) are coupled to respective multiple inputs of the multi-line processing block $302_2$. Multiple outputs of the multi-line processing block $302_2$ (from the respective processing units) are coupled to respective multiple inputs of the multi-line processing block $302_3$. Multiple outputs of the multi-line processing block $302_3$ (from the respective processing units) are coupled to respective multiple inputs of the multi-line processing block $302_4$. An output of the multi-line processing block $302_4$ (from the processing unit) is coupled to an input of the single-line processing block 308. An output of the single-line processing block 308 is coupled to an input of the memory interface 310.

Figure 4:
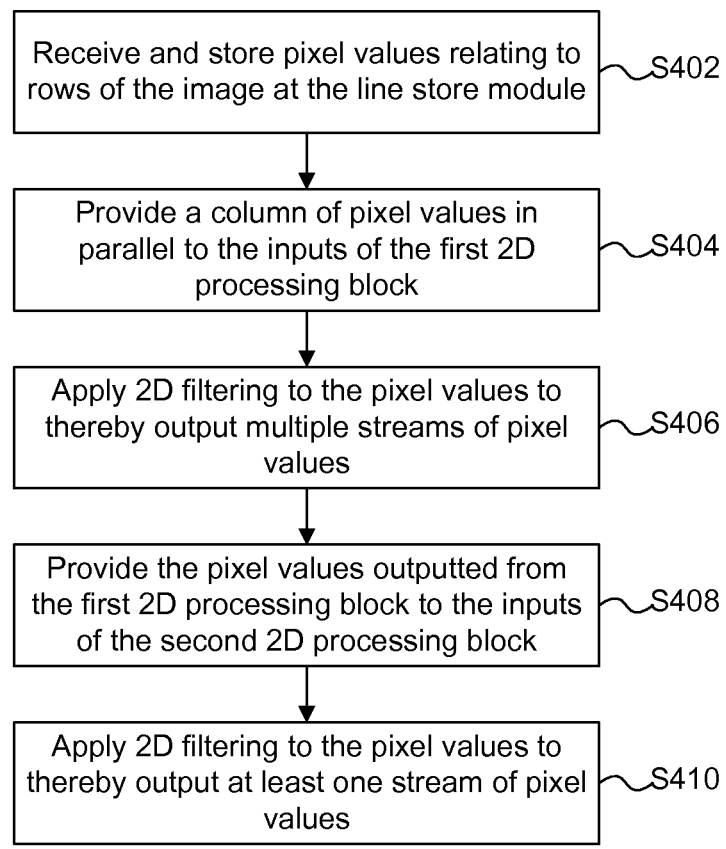
FIG. 4 is a flow chart for a process of processing an image.

The operation of the image processing system 204 is described with reference to FIG. 4 which is a flow chart for a process of processing an image.

In operation, the single-line processing block 306 is configured to perform processing on a single line of pixel values it receives from the preceding blocks of the image processing system 204. The single-line processing block 306 acts upon pixel values from a row of pixels of the image without requiring access to pixel values from other pixel rows of the image. For example, the single-line processing block 306 may adjust the gains of the pixel values, adjust the white balance of the pixel values, or perform a one-dimensional (1D) filtering along one of the lines (e.g. a row) of pixels.

In step S402, pixel values relating to the rows of the image are outputted from the single-line processing block 306 and received in a serial manner at the line store module 304. The line store module 304 stores the pixel values for a plurality of rows of the image. In this example, the pixel values are stored in the line store module 304 in lines corresponding to the pixel lines (e.g. rows) of the image.

In step S404, the line store module 304 provides multiple pixel values, in parallel, from respective multiple rows of the image to the processing block $302_1$. Multiple pixel values may be provided from the line store module 304 to the processing block $302_1$ in each of a plurality of processing cycles. A "processing cycle" represents the time over which each pixel value (or group of pixel values where the pixel values from multiple lines are processed in parallel) is processed by one of the processing blocks before the next pixel value in that line (or lines) can be processed by the processing block. That is, a new group of one or more pixel values is processed by the image processing system 204 in each of a plurality of processing cycles. In one example, the processing cycles may correspond to clock cycles. More generally, the processing cycles may correspond to one or more clock cycles. In the example shown in FIG. 3, a column of eleven pixel values is provided from the line store module 304 to the respective eleven inputs of the processing block $302_1$.

In step S406, each of the processing units of the processing block $302_1$ receives pixels values received at at least some of the inputs of the processing block $302_1$ and processes those pixel values (e.g. filters the pixel values) to provide a single output pixel value (e.g. a filtered pixel value) per processing cycle. In the example shown in FIG. 3, there are eleven processing units in the processing block $302_1$, each of which receives the pixel values received at all eleven of the inputs of the processing block $302_1$ to provide eleven parallel outputs.

In step S408, the outputs of the processing block $302_1$ are provided, as a column of pixel values (e.g. eleven pixel values) per processing cycle, to respective inputs of the processing block $302_2$. The pixel values outputted from the processing units (μ) of the processing block $302_1$ may be provided directly to the inputs of the processing block $302_2$. A line store module is not implemented between the processing blocks $302_1$ and $302_2$.

Similar to processing block $302_1$, the processing block $302_2$ comprises a plurality of processing units (which may also be referred to herein as "kernels"), labelled "μ" in FIG. 3. In step S410, each of the processing units of the processing block $302_2$ receives pixels values received at at least some of the inputs of the processing block $302_2$ and processes those pixel values (e.g. filters the pixel values) to provide a single output pixel value (e.g. a filtered pixel value) per processing cycle. In the example shown in FIG. 3, there are eleven processing units in the processing block $302_2$, each of which receives the pixel values received at some or all of the eleven inputs of the processing block $302_2$ to provide eleven parallel outputs.

The pixel values for the rows of the image pass from multiple outputs of the multi-line processing blocks to multiple inputs of the next multi-line processing block in the image processing system 204. This avoids a need to implement a respective line store module before each of the multi-line processing blocks.

In the example shown in FIG. 3, the third multi-line processing block $302_3$ receives the eleven outputs from the second multi-line processing block $302_2$ at a respective eleven inputs of the third multi-line processing block $302_3$. The third multi-line processing block $302_3$ comprises seven processing units (μ) each of which are configured to receive pixel values received at at least some of the eleven inputs of the processing block $302_3$ and process those pixel values (e.g. filter the pixel values) to provide a single output pixel value (e.g. a filtered pixel value) per processing cycle. The seven outputs from the respective seven processing units of the third multi-line processing block $302_3$ are provided to a respective seven inputs of the fourth multi-line processing block $302_4$.

In the example shown in FIG. 3, the fourth multi-line processing block $302_4$ receives the seven outputs from the third multi-line processing block $302_3$ at a respective seven inputs of the fourth multi-line processing block $302_4$. The fourth multi-line processing block $302_4$ comprises one processing unit (μ) which is configured to receive pixel values received at the seven inputs of the processing block $302_4$ and process those pixel values (e.g. filter the pixel values) to provide a single output pixel value (e.g. a filtered pixel value) per processing cycle. The output from the processing unit of the fourth multi-line processing block $302_4$ is provided to an input of the single-line processing block 308.

The single-line processing block 308 is configured to perform single-line processing on pixel values it receives from the fourth multi-line processing block $302_4$. As described above, examples of single-line processing which the single-line processing block 308 may apply include adjusting the gains of the pixel values, adjusting the white balance of the pixel values, or performing a 1D filtering along one of the lines (e.g. a row) of pixels.

The single-line processing block 308 is arranged to provide output pixel values to the memory interface 310 which acts as the output of the image processing system 204 to thereby provide the processed image data to the memory 206. As described above, the processed image data outputted from the image processing system 204 may additionally or alternatively be used for purposes other than for storage in the memory 206, such as for display or for transmission in a communication session.

In an image processing system which implements four multi-line processing blocks in accordance with the concepts shown in FIG. 1, four line store modules would be included: one line store module preceding each of the four multi-line processing blocks in the image processing system. In comparison, in the image processing system 204 shown in FIG. 3, only one line store module 304 is implemented.

Line store modules are an expensive resource due to their power consumption and silicon area. Therefore, reducing the number of line store modules in the image processing system helps to lower power consumption and silicon area. Reducing the number of line store modules in the image processing system may also reduce the latency with which the image data is processed by the image processing system, which is particularly important for processing image data for use in real-time (e.g. when capturing video data which is to be displayed in real-time).

The image processing system 204 does not need four line store modules in order to implement four multi-line processing blocks because at least some of the multi-line processing blocks 302 have multiple outputs which can be provided as the multiple inputs for a subsequent multi-line processing block in the image processing system 204. As described above, examples of multi-line processing blocks include a 2D filtering block and a 1D filtering block which performs filtering in a direction that is not parallel to the lines (e.g. rows) of pixels in the image. In order for the multi-line processing blocks to have multiple outputs, the multi-line processing blocks comprise multiple kernels (or "processing units") which are operated in parallel. For example, the multi-line processing block $302_1$ computes eleven pixel values per processing cycle (as compared to one pixel value computed by the processing block $102_1$ shown in FIG. 1). It can be seen that the multi-line processing block $302_1$ requires the implementation of eleven kernels, which is ten more than are implemented in the processing block $102_1$ shown in FIG. 1. There is a trade-off between the extra processing logic required for the extra kernels in the processing block $302_1$ and the reduction in the number of line stores that are required in the image processing system 204. As the resolution of image sensors (e.g. image sensor 202) increases, longer line stores are needed to store pixel values for the pixel rows of the image, and therefore the benefit achieved by reducing the number of line stores increases, and the balance in the trade-off may shift towards implementing the extra kernels.

In examples, the first processing block $302_1$ is a denoiser block. The denoiser block $302_1$ operates to remove or reduce noise from the pixel values. The denoiser block $302_1$ may apply a two-dimensional filtering to the pixel values corresponding to a two-dimensional area of the image. For example, the two-dimensional filtering may be a symmetrical filtering, e.g. a linear symmetrical filtering. A person skilled in the art would know how to apply a symmetrical filtering to the pixel values. In an example, a two-dimensional symmetrical filter may be applied to an 11×11 array of pixel values centered on a target pixel to determine the filtered value for the target pixel value. Symmetrical filtering such as this uses border pixel values surrounding the target pixel value to determine the filtered value of the target pixel. For example, the symmetrical filter may use pixel values from the five rows above and the five rows below the target pixel, as well as the values of the surrounding pixels on the same row as the target pixel. When calculating the filtered value of the target pixel, the surrounding pixel values considered by the symmetrical filter may be weighted according to their distance from the target pixel. In this case, pixel values that are closer to the target pixel may be weighted more heavily than pixel values that are further away from the target pixel.

However, the denoiser block $302_1$ provides eleven outputs corresponding to eleven input rows of pixel values of the image. If the denoiser block $302_1$ were to use symmetrical filtering which allowed for two 5 pixel borders as in the example described above, the denoiser block $302_1$ would need twenty input rows of pixel values from the line store module 304.

Whilst the denoiser block $302_1$ may be implemented using symmetrical filtering as described above, to avoid the use of border pixels, in the example shown in FIG. 3, the denoiser block $302_1$ is implemented using asymmetrical filtering (e.g. asymmetrical non-linear filtering). In this way, the target pixels "T" are offset from the centre of the area of pixel values considered in the filtering applied by the kernels. The asymmetrical filtering does not necessarily consider an area of pixel values that is centred on the target pixel. For example, each of the kernels of the denoiser $302_1$ may implement a bilateral filter. A bilateral filter is an example of a non-linear filter. A person skilled in the art would know how to implement a bilateral filter. A bilateral filter implemented in the denoiser block $302_1$ may denoise the target pixels without using a symmetrical filter kernel of fixed coefficients. When a bilateral filter is applied to an array of pixel values, the pixel values within the considered range are weighted according to a similarity between their intensity and the intensity of the target pixel value. The weightings of the pixel values may also depend upon the distance from the target pixel, although not strongly. In other words, the weightings are affected to a greater extent by the similarity between the pixel values and the value of the target pixel than they are affected by the distance between the pixels and the target pixel. Since the pixel values considered by the bilateral filtering are weighted according to their similarity to the target pixel value, it is less important than with the symmetrical filtering that the filter is centred on the target pixel.

The denoiser block $302_1$ has eleven inputs, eleven kernels and eleven outputs. Each of the eleven kernels receives the pixel values received at each of the eleven inputs of the denoiser block $302_1$. In this way, the eleven kernels overlap fully with each other and the eleven outputs are aligned with the eleven input rows. It may be beneficial that all of the kernels within a multi-line processing block overlap (i.e. take the same inputs as each other) because in this way, the kernels can operate in parallel, but some memory (e.g. registers) may be used to temporarily store the values of the pixels which are to be considered by the kernels. In this way, the values of the pixels which are to be considered by the kernels do not need to be stored separately for use by each of the kernels. In other words, the kernels within a multi-line processing block can share some of the processing resources with each other.

Figure 5A:
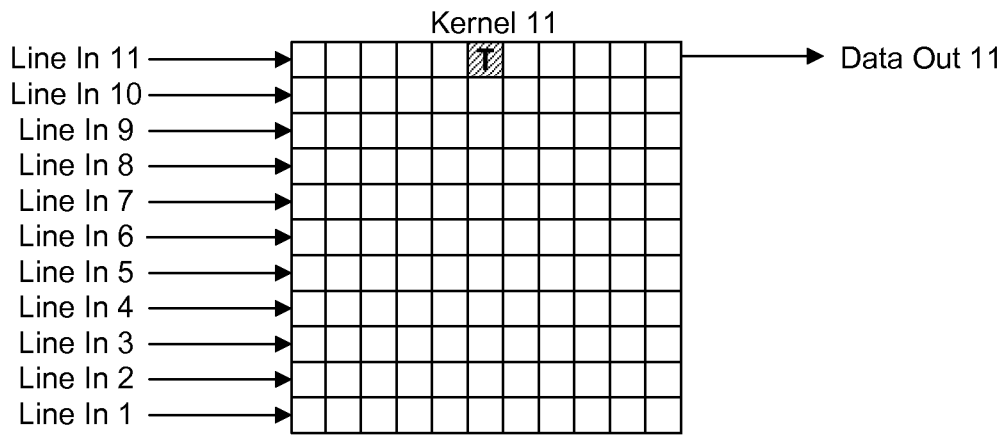
FIGS. 5a to 5c show simplified representations of filtering applied by three processing units within a multi-line processing block.
Figure 5B:
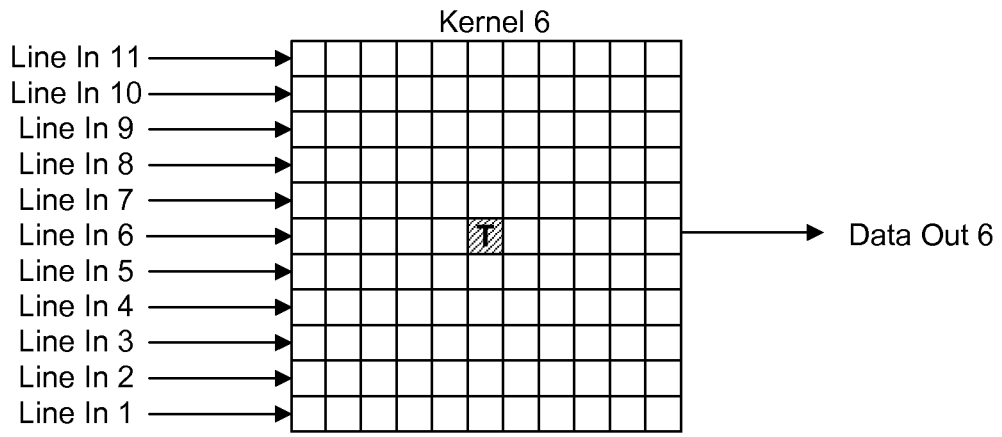
Figure 5C:
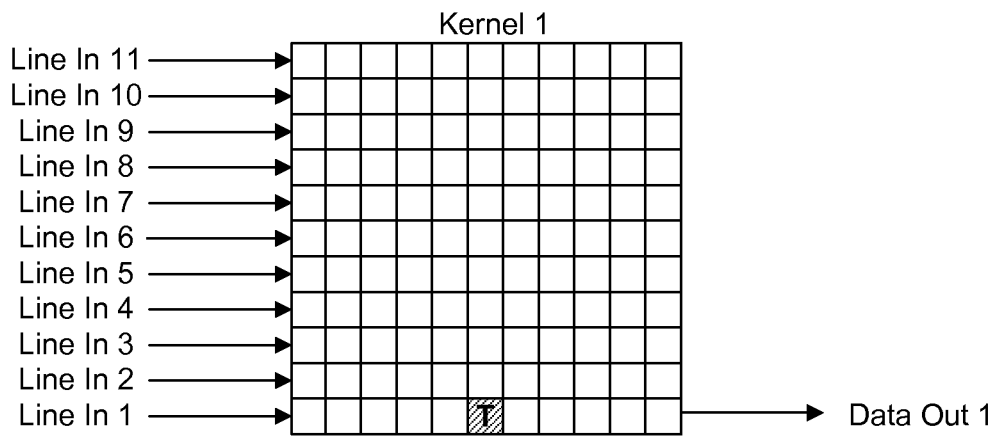

FIGS. 5a to 5c show simplified representations of the filtering applied by three of the eleven kernels within the denoiser block $302_1$. FIG. 5a shows the area of pixels that is considered by the eleventh kernel of the denoiser block $302_1$. FIG. 5b shows the area of pixels that is considered by the sixth kernel of the denoiser block $302_1$. FIG. 5c shows the area of pixels that is considered by the first kernel of the denoiser block $302_1$. Each of the kernels receives pixel values relating to eleven of the rows of the image which have been received at the denoiser block $302_1$ on the respective inputs labelled "Line In 1" to "Line In 11". Each kernel operates to provide a filtered pixel value on a respective one of eleven output lines (labelled "Data Out 1" to "Data Out 11"). It can be seen from FIG. 5b that the sixth kernel determines the value of a target pixel ("T") for output on the sixth output line ("Data Out 6") by considering an 11×11 array of pixel values surrounding the target pixel and centred on the target pixel. This is similar to the symmetrical filtering described above. In contrast, it can be seen from FIGS. 5a and 5c that the first and eleventh kernels determine the values of their target pixels ("T") for output on the respective first and eleventh output lines ("Data Out 1" and "Data Out 11") by considering the same 11×11 array of pixel values as that considered by the sixth kernel, which is not centred on the target pixels of the first or eleventh kernels. As described above, this is acceptable when using a bilateral filter because the weighting applied to the pixel values depends upon the similarity between the pixel values and the target pixel value, and does not depend strongly (i.e. to a significant extent) upon the location of the pixels.

The bilateral filtering implemented by the denoiser block $302_1$ does have some dependence (albeit a weak dependence) upon the distance between the pixel values considered by the filter and the target pixel. Therefore, it may be optimal for the kernels to be centred upon their respective target pixels. However, this would require further input lines of pixel values (e.g. five rows of pixel values for rows above the target pixel considered by kernel 11 and five rows of pixel values for rows below the target pixel considered by kernel 1), which in turn would require that the line store module 304 stores and provides a larger number of rows of pixel values. The advantage gained by improving the bilateral filtering implemented by some of the kernels may be outweighed by the disadvantages associated with increasing the size of the line store module 304, but this is an implementation choice. Furthermore, as described below, the accuracy of the outer pixel lines (e.g. the first and eleventh output lines denoted "Data Out 1" and "Data Out 11") might not be as important as the accuracy of the central pixel lines (e.g. the sixth output line denoted "Data Out 6") considered by the bilateral filter because the outer pixel lines are more likely than the central pixel lines to be used just as border pixels in subsequent multi-line processing blocks.

In examples, the second processing block $302_2$ is a defective pixel fixing (DPF) block. The DPF block $302_2$ operates to correct for defective pixels in the image. Defective pixels have an incorrect value. For example, a defective pixel may be a dead pixel which never shows light or a stuck pixel which always shows light. The DPF block $302_2$ applies 2D filtering to correct the defective pixels. The filtering applied by the DPF block $302_2$ is symmetrical filtering (e.g. linear filtering). As described above, symmetrical filtering would use border pixels to perform optimally. However, the DPF block $302_2$ has eleven inputs, eleven kernels applying the symmetrical filtering and eleven outputs. The eleven kernels of the DPF block $302_2$ operate in a similar manner to that described above in relation to the eleven kernels of the denoiser $302_1$, but the kernels of the DPF block $302_2$ apply symmetrical filtering rather than asymmetrical, bilateral filtering. It can be appreciated that some of the kernels of the DPF block $302_2$ will not receive sufficient border pixels to optimally apply the symmetrical filtering. Some of the kernels of the DPF block $302_2$ may copy rows of pixels for use as border pixels in the filtering. For example, the eleventh kernel of the DPF block $302_2$ may copy one or more rows of pixel values for use as border pixels to represent the pixel values in one or more rows above the target pixel for the eleventh kernel in order to determine the filtered pixel value for output on the eleventh output line ("Data Out 11").

The symmetrical filtering applied by the DPF block $302_2$ will therefore be more accurate for the rows closer to the centre row (received on the sixth input, "Line In 6") than for the rows closer to the edge of the 11×11 array considered by the kernels. This is acceptable because the pixel values output for the outer rows (e.g. on output lines 1 and 11) are used only for border pixel values in the subsequent multi-line processing block $302_3$, and therefore are not required to be as accurate as the pixel values which will correspond to the target pixels in the subsequent multi-line processing block $302_3$.

In examples, the third multi-line processing block $302_3$ is a lateral chromatic aberration (LCA) correction block. The LCA correction block $302_3$ operates to correct lateral chromatic aberration by filtering the pixel values. The LCA correction block $302_3$ comprises seven kernels each configured to implement symmetrical filtering on the pixel values received at at least some of the eleven inputs of the LCA correction block $302_3$. Since the number of kernels is less than the number of inputs for the LCA correction block $302_3$, each of the kernels can use border pixels when applying the symmetrical filtering to the pixel values received from the DPF block $302_2$.

In examples, the fourth multi-line processing block $302_4$ is a demosaicer block $302_4$. In operation the demosaicer block $302_4$ reconstructs a full color image from a sparse set of colour samples. The demosaicer block $302_4$ comprises one kernel configured to implement symmetrical filtering on the pixel values received at the seven inputs of the demosaicer block $302_4$. The kernel of the demosaicer block $302_4$ can use border pixels when applying the symmetrical filtering to the pixel values received from the LCA correction block $302_3$ because it receives the seven rows of pixel values from the LCA correction block $302_3$.

The examples given above for the multi-line processing blocks are given by way of example only. Four multi-line processing blocks are shown in FIG. 3, but in other examples, more or less than four multi-line processing blocks may be included in the image processing system 204. The kernels implemented in the multi-line processing blocks 302 may implement symmetrical or asymmetrical (e.g. bilateral filtering). Each of the kernels implemented in a multi-line processing block 302 may apply multi-line filtering to the pixel values received at all of the inputs of the multi-line processing block 302. Alternatively, some (or all) of the kernels implemented in a multi-line processing block 302 may apply multi-line filtering to the pixel values received at a respective subset of the inputs of the multi-line processing block 302. For example, each of the seven kernels of the LCA correction block $302_3$ may apply filtering to pixel values received at a subset of five of the eleven inputs of the LCA correction block $302_3$.

As described above, the number of kernels in a multi-line processing block 302 may be equal to the number of inputs of the processing block 302. In this way, the number of outputs of the processing block 302 is the same as the number of inputs of the processing block 302. This is the case in the denoiser block $302_1$ and the DPF block $302_2$ in the examples described above. Alternatively, the number of kernels in a multi-line processing block 302 may be less than the number of inputs of the processing block 302. In this way, the number of outputs of the processing block 302 is less than the number of inputs of the processing block 302. This is the case in the LCA correction block $302_3$ and the demosaicer block $302_4$ in the examples described above. Alternatively, the number of kernels in a multi-line processing block 302 may be more than the number of inputs of the processing block 302. In this way, the number of outputs of the processing block 302 is more than the number of inputs of the processing block 302.

In the examples described above, rows of pixel values are stored in the line store module 304. The rows of pixel values are provided to the inputs of the multi-line processing blocks 302. This is in accordance with a conventional raster scan in which pixel values are scanned in order, row by row. However, it would be possible to organize the pixel values according to their columns, rather than organizing the pixel values according to their rows. In this way, columns of pixel values would be stored in the line store module 304 and the columns of pixel values would be provided to the inputs of the multi-line processing blocks 302. In other words, lines of pixel values are stored in the line store module 304 and provided to the inputs of the multi-line processing blocks 302, but whether these lines are rows or columns of pixels is not significant to the implementation of the image processing system.

Figure 6:
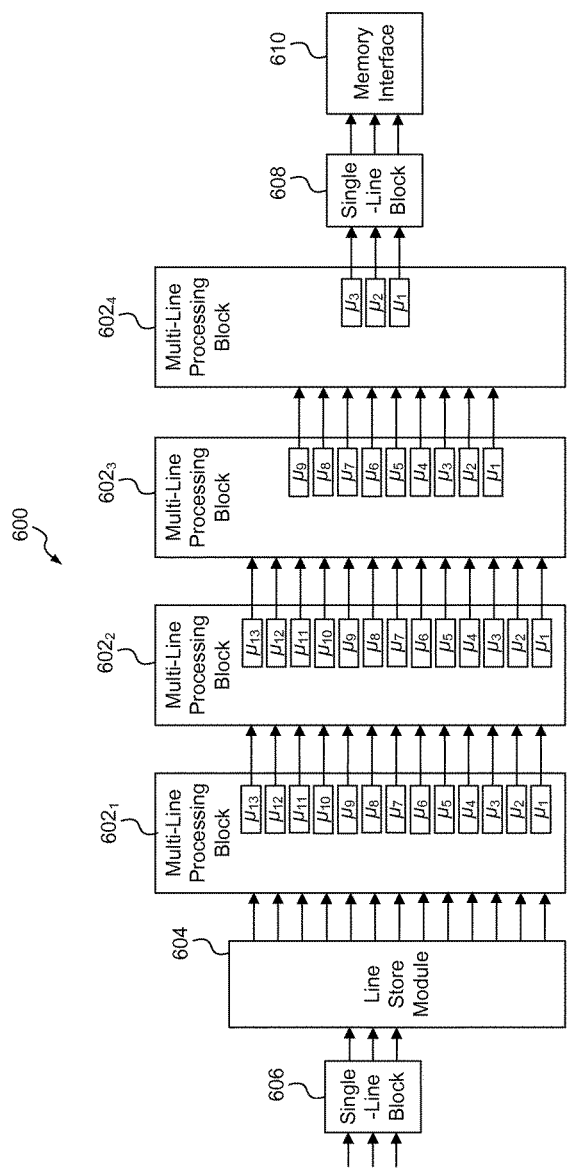
FIG. 6 is a simplified schematic diagram of part of another image processing system.

FIG. 6 is a simplified schematic diagram of part of another image processing system 600. The image processing system 600 corresponds to the image processing system 204 shown in FIG. 3. However, the image processing system 600 allows for increased parallel processing as described below.

As shown in FIG. 6, pixel values from three lines of an image are processed in parallel through the multi-line processing blocks 602 of the image processing system 600. The arrows in FIG. 6 represent lines of pixel values. As shown in FIG. 6, pixel values of three lines of an image are provided from the single-line processing block 606 to the line store module 604 in each of a plurality of processing cycles (e.g. in each of a plurality of clock cycles). The term "single-line processing block" refers to the nature of the processing being applied, in which processing of pixel values on each line takes place without requiring access to pixel values from other pixel lines of the image, and not to the number of lines being processed in parallel. The multi-line processing blocks 602 process the data in parallel, and provide pixel values of three of the lines of the image as an output to the single-line processing block 608 in each of the processing cycles. In this way, the throughput of the image processing system 600 is increased (e.g. by a factor of three in this example), compared to that of the image processing system 204 in which pixel values of just one line of the image are provided to the line store module 304 in each processing cycle and pixel values of just one line of the image are provided as an output to the single-line processing block 308. That is, by processing the three lines of pixel values in parallel, for each processing cycle three times as many pixel values are outputted by the image processing system 600 as compared to the image processing system 204 shown in FIG. 3. This increase in the performance of the image processing system 600 requires extra processing logic. For the single-line processing blocks, it is likely that three times as much processing logic would be required as compared to processing a single line of pixel values at a time, as shown for image processing system 204. However, for the multi-line processing blocks, although an increase in processing logic is required to process the three lines of pixel values at a time, less than three times as much processing logic would be required as compared to processing a single line of pixel values at a time, as shown for image processing system 204. In fact for the multi-line processing blocks 602 shown in FIG. 6, much less than three times as much processing logic would be required as compared to processing a single line of pixel values at a time. Therefore, processing the three lines of pixel values in parallel may be beneficial compared to processing single lines of pixel values at a time as in the image processing system 204.

The single-line processing block 606 is arranged to receive pixel values relating to three lines of pixels of the image in each processing cycle, e.g. in parallel, or in a serial manner where the pixel values are received three times as quickly as they are subsequently processed by the multi-line processing blocks 602, such that pixel values from three lines of the image are received in each processing cycle. The single-line processing block 606 is configured to operate on the pixel values from the three lines in each of the processing cycles (e.g. in parallel, or in series at three times the speed as indicated above) and to provide pixel values for three lines of the image in each processing cycle which are provided to the line store module 604 (e.g. in parallel or in series at three times the speed). The line store module 604 is configured to store the three lines of pixel values as well as previously received lines of pixel values. In the example shown in FIG. 6, the line store module 604 is further configured to provide thirteen lines of pixel values to the first multi-line processing block $302_1$.

It should be noted that eleven lines of pixel values are provided to the multi-line processing block $302_1$ in the image processing system 204 in order for the image processing system 204 to process the pixel values from one pixel line, whereas thirteen (i.e. eleven plus two), and not thirty three (i.e. eleven multiplied by three), lines of pixel values are provided to the multi-line processing block $602_1$ in the image processing system 600 in order for the image processing system 204 to process the pixel values from three pixel lines.

The multi-line processing block $602_1$ comprises thirteen processing units (or "kernels"), each of which is arranged to receive pixel values received at the multi-line processing block $602_1$ at at least some of the inputs of the multi-line processing block $602_1$. The processing units of the multi-line processing block $602_1$ operate in parallel to provide thirteen outputs of filtered pixel values corresponding to the thirteen pixel lines.

It should be noted that eleven processing units are implemented in the multi-line processing block $302_1$ in the image processing system 204 in order for the image processing system 204 to process the pixel values from one pixel line, whereas thirteen (i.e. eleven plus two), and not thirty three (i.e. eleven multiplied by three), processing units are implemented in the multi-line processing block $602_1$ in the image processing system 600 in order for the image processing system 600 to process the pixel values from three pixel lines.

The thirteen filtered pixel values are received at respective inputs of the second multi-line processing block $602_2$. It will be appreciated that the second multi-line processing block $602_2$ has thirteen processing units to provide thirteen outputs to respective inputs of the third multi-line processing block $602_3$. The third multi-line processing block $602_3$ has nine processing units to provide nine outputs to respective inputs of the fourth multi-line processing block $602_4$. The fourth multi-line processing block $602_4$ has three processing units to provide three outputs to respective inputs of the single-line processing block 608. The single-line processing block 608 has three outputs to provide the pixel values of three pixels line as an output in parallel, e.g. to the memory interface 610.

In the image processing system 600 shown in FIG. 6 two extra data streams are processed in parallel compared to the image processing system 204 shown in FIG. 3. This is achieved with a small increase in processing logic in the multi-line processing blocks (e.g. an increase from eleven to thirteen processing units in the first multi-line processing block $302_1$, i.e. an 18% increase in the number of processing units). Using the same concepts, in other, more general, examples of image processing systems, pixel values from N pixel lines of the image, where N>1, may be processed in parallel. This is achieved by altering the number of processing units in the multi-line processing blocks, as appropriate.

In general, the last multi-line processing block (e.g. the fourth processing block $602_4$ in the image processing system 600) is arranged to provide N outputs for further processing by one or more single-line processing block (e.g. the single-line processing block 608 and/or the memory interface 610 in the image processing system 600), where N≥1. Where N>1, the N outputs may be further processed in parallel by the one or more single-line processing block (e.g. the single-line processing block 608 and/or the memory interface 610). That is, the last multi-line processing block (e.g. the fourth processing block $602_4$ in the image processing system 600) is arranged to output pixel values relating to three lines of pixels of the image in each processing cycle to the single-line processing block 608, e.g. in parallel, or in a serial manner where the pixel values are output three times as quickly as they are previously processed by the multi-line processing blocks 602, such that pixel values from three lines of the image are output to the single-line processing block 608 in each processing cycle.

Figure 7:
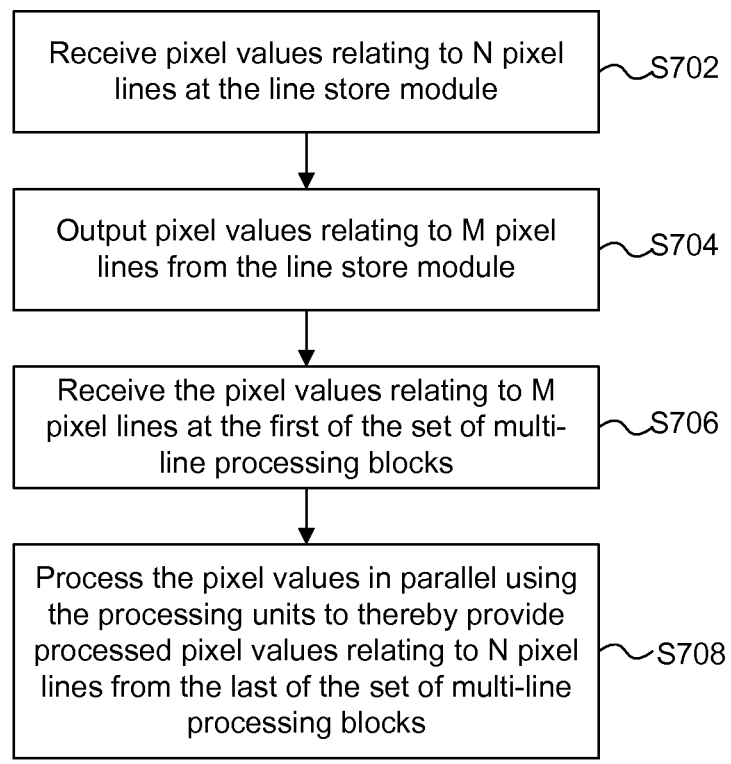
FIG. 7 is a flow chart for a method of processing pixel values from N pixel lines in parallel, where N>1.

FIG. 7 shows a flow chart for a method of processing pixel values from N pixel lines in parallel in the image processing system 600, where N>1. In a general example, the image processing system 600 comprises a line store module 604 and a set of one or more multi-line processing blocks 602. In step S702 the line store module 604 receives pixel values relating to the N pixel lines of the image from the single-line processing block 606.

In step S704 pixel values relating to M pixel lines of the image are output in parallel from the line store module 604. In this example, M>N. In step S706 the pixel values output from the line store module 604 are received, in parallel, at a plurality of inputs of a first of the multi-line processing blocks in the set (i.e. processing block $602_1$). In step S708 the processing units of the processing block $602_1$ are operated in parallel to provide processed pixel values relating to a respective one of the pixel lines of the image by applying multi-line processing to the pixel values received at at least some of the inputs of the processing block $602_1$. The pixel values are processed by all of the multi-line processing blocks 602. A last of the multi-line processing blocks in the set (e.g. processing block $602_4$ in the example shown in FIG. 6) provides processed pixel values relating to N of the pixel lines of the image (e.g. as N parallel outputs) for further processing in the image processing system 600, e.g. by the single-line processing block 608.

As an example, if there is only one multi-line processing block 602 in the set, then the first of the multi-line processing blocks in the set is also the last of the multi-line processing blocks in the set. However, if there are a plurality of multi-line processing blocks in said set (e.g. in the example, shown in FIG. 6 in which there are four multi-line processing blocks 602 in the set), then the processed pixel values provided by one of the multi-line processing blocks are received at the inputs of another of the multi-line processing blocks, in sequence as described above.

The method steps shown in FIG. 7 are repeated on each of a plurality of processing cycles. The processing cycles may correspond to one or more clock cycles.

Increasing the number of pixel lines from which pixel values are processed in parallel may increase the performance of the image processing system. In this way the performance of the image processing system is easily scalable for handling large quantities of image data by processing a pixel values from a greater number of pixel lines (e.g. rows) in parallel. This may become more and more useful as the resolution of image sensors increases such that the amount of data used to represent each image increases. As described above, there is a trade-off between the extra processing logic required for the extra kernels in the processing blocks and the reduction in the number of line stores that are required in the image processing system. As the number of pixel lines from which pixel values are processed in each processing cycle increases, the benefit achieved by implementing the extra kernels increases (because as described above, fewer than N times as many kernels are used in order to process pixel values from N pixel lines of the image in each processing cycle). Therefore, the balance in the trade-off may shift further towards implementing the extra kernels. That is, the trade-off becomes much more favourable in terms of using the extra kernels when parallelism introduced in the image processing system, as shown in FIG. 6.

In other words, the additional work done by the kernels to reduce the number of line stores can be exploited in order to increase the parallelism in the image processing system. That is the number of pixel lines that can be processed in each processing cycle increases by a larger factor than the increase in the hardware used to process the extra pixel lines.

The image processing systems described herein may be implemented in hardware or software on a device. For example, any of the image processing systems described herein may be implemented on a field-programmable gate array (FPGA), or as a fixed-function application-specific integrated circuit (ASIC).

Generally, any of the functions, methods, techniques or components described above can be implemented in modules using software, firmware, hardware (e.g., fixed logic circuitry), or any combination of these implementations. The terms "module," "functionality," "component", "unit," "block" and "logic" are used herein to generally represent software, firmware, hardware, or any combination thereof.

In the case of a software implementation, the module, functionality, component, "unit", "block" or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. An image processing pipeline comprising:
a first multi-line processing block configured to apply multi-line processing to a plurality of pixel values; and
a second multi-line processing block configured to apply multi-line processing to the plurality of pixel values which have been processed by the first multi-line processing block,
wherein no line store module is implemented between the first and second multi-line processing blocks in the image processing pipeline.

2. The image processing pipeline of claim 1 wherein the first multi-line processing block comprises a plurality of processing units configured to apply the multi-line processing to respective pixel values.

3. The image processing pipeline of claim 2 wherein the processing units of the first multi-line processing block are configured to output processed pixel values directly to inputs of the second multi-line processing block.

4. The image processing pipeline of claim 1 wherein the first multi-line processing block comprises a plurality of inputs configured to receive pixel values relating to a plurality of pixel lines of an image in parallel.

5. The image processing pipeline of claim 4 wherein a number of processing units of the first multi-line processing block is equal to the number of inputs of the first processing block.

6. The image processing pipeline of claim 4 wherein a number of processing units of the first multi-line processing block is less than the number of inputs of the first processing block.

7. The image processing pipeline of claim 1 further comprising a line store module implemented before the first multi-line processing block in the image processing pipeline, wherein the line store module is configured to:
store pixel values of pixel lines of an image; and
provide pixel values in parallel to inputs of the first multi-line processing block.

8. The image processing pipeline of claim 1 further comprising a further multi-line processing block configured to provide pixel values in parallel to inputs of the first multi-line processing block.

9. The image processing pipeline of claim 1 wherein the multi-line processing which the first processing block is configured to apply is asymmetric filtering.

10. The image processing pipeline of claim 9 wherein the asymmetric filtering is bilateral filtering.

11. The image processing pipeline of claim 1 wherein the multi-line processing which the first processing block is configured to apply is symmetric filtering.

12. The image processing pipeline of claim 1 further comprising one or more single-line processing blocks configured to process N pixel values in parallel, wherein the second multi-line processing block is arranged to provide N outputs for further processing by one or more of the one or more single-line processing blocks, where N is greater than one.

13. The image processing pipeline of claim 1 further comprising at least one further multi-line processing block arranged either: (i) to provide pixel values in parallel to the first multi-line processing block, or (ii) to receive, in parallel, pixel values processed by the second multi-line processing block.

14. The image processing pipeline of claim 1 wherein the first multi-line processing block has multiple outputs which are provided as multiple inputs for the second multi-line processing block.

15. The image processing pipeline of claim 1 wherein the multi-line processing which the first multi-line processing block is configured to apply is different to the multi-line processing which the second multi-line processing block is configured to apply.

16. A method of processing an image in an image processing pipeline, the method comprising:
applying multi-line processing to a plurality of pixel values at a first multi-line processing block of the image processing pipeline;
receiving, at a second multi-line processing block of the image processing pipeline, the plurality of pixel values which have been processed by the first multi-line processing block and which have not been stored in a line store module subsequent to being processed by the first multi-line processing block; and
applying, multi-line processing to the received the plurality of pixel values at the second multi-line processing block.

17. The method of claim 16 further comprising outputting processed pixel values from the second multi-line processing block.

18. The method of claim 17 further comprising applying further processing to the pixel values outputted from the second multi-line processing block.

19. The method of claim 16 wherein the second processing block provides N outputs for further processing by one or more single-line processing blocks, where N is greater than one, the method further comprising processing the N outputs in parallel by the one or more single-line processing blocks.

20. A non-transitory computer readable storage medium having stored thereon a computer readable description of an integrated circuit that, when processed/executed by a processor, causes a system to generate an image processing pipeline, said image processing pipeline comprising:
a first multi-line processing block configured to apply multi-line processing to a plurality of pixel values; and
a second multi-line processing block configured to apply multi-line processing to the plurality of pixel values which have been processed by the first multi-line processing block,
wherein no line store module is implemented between the first and second multi-line processing blocks in the image processing pipeline.

\* \* \* \* \*